United States Patent Office 2,790,822
Patented Apr. 30, 1957

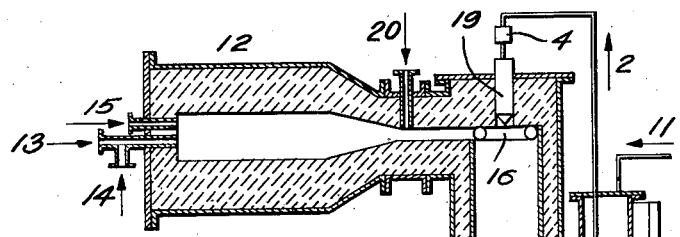
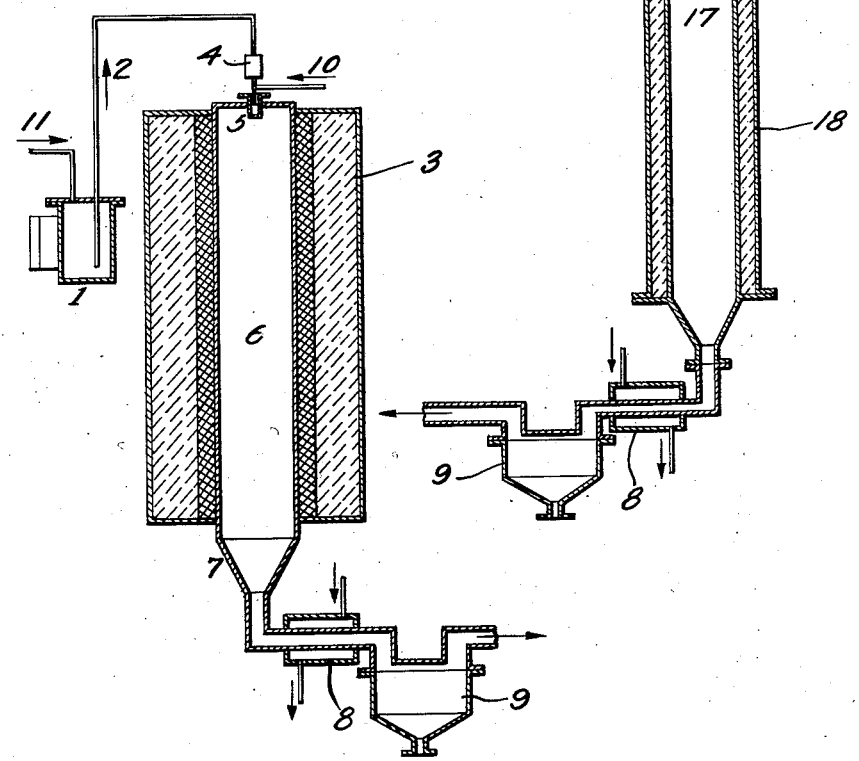

2,790,822

PROCESS FOR THE PREPARATION OF ALIPHATIC α-UNSUBSTITUTED α-β-UNSATURATED CARBOXYLIC ACIDS AND THEIR DERIVATIVES

Arthur Wolfram, Frankfurt am Main, Karl-Heinz Steil, Knapsack, near Koln, and Artur Agunte, Lechenich, near Koln, Germany, assignors to Knapsack-Griesheim Aktiengesellschaft, Knapsack, near Koln, Germany Application August 10, 1954, Serial No. 453,656

Claims priority, application Germany August 12, 1953

9 Claims. (Cl. 260—465.9)

It is known that α-substituted α-hydroxy-carboxylic acids or their derivatives can be converted into the corresponding α-β-unsaturated compounds. α-Methacrylic acid nitrile was obtained by the action of phosphorus pentoxide on acetone cyanhydrin and α-phenyl-acrylic acid (atropic acid) was obtained from α-phenyl-α-hydroxypropionic acid (atrolactinic acid) by boiling with hydrochloric acid.

When trying to split off water from lactic acid, there are obtained lactide, lactyl lactic acid, and other compounds. According to another method, lactic acid splits over pumice at 440–460° C. into acetaldehyde and formic acid, and lactic acid nitrile did not furnish any acrylonitrile either when reacted with phosphorus pentoxide.

Up to now, it was, therefore, necessary to prepare the especially important, α-unsubstituted α-β-unsaturated acids and their derivatives by indirect ways. In order to obtain the technically important acrylonitrile, for instance, from the easily accessible lactic acid nitrile, the hydroxy group of the lactic acid nitrile was, for instance, acetylated with acetic anhydride and a molecule of acetic acid was then split off at a raised temperature. According to another process, the preparation of acrylonitrile from lactic acid nitrile was dispensed with and, instead of this step, the more expensive β-hydroxy-propionic acid nitrile was used as starting material for the manufacture of acrylonitrile.

We have found that α-β-unsaturated aliphatic carboxylic acids which are unsubstituted in α-position can be obtained from the corresponding α-hydroxy-acids if these are treated at temperatures ranging from 520° C. to 700° C., preferably from 580° C. to 650° C., for a short time with acidic agents.

Not only the acids can be prepared according to the process of the present invention but also their derivatives, especially the nitriles or amides from the corresponding derivatives of the hydroxy-carboxylic acids. The process according to the present invention is especially suitable for the manufacture of the α-β-unsaturated carboxylic acids with 3 to 5 carbon atoms and particularly for acrylonitrile. The carbon chain can also be branched in β-position. According to the process of the present invention, it is also possible, however, to prepare α-substituted α-β-unsaturated carboxylic acids and their derivatives, for instance methacrylic acid and its derivatives. According to the invention, there may generally be prepared compounds of the formula (I) 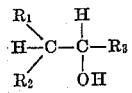

in which $R_1$ and $R_2$ represent hydrogen and saturated alkyl and preferably contain not more than 2 carbon atoms and $R_3$ stands for

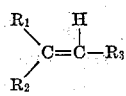

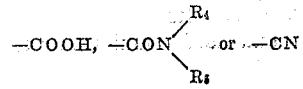

$R_4$ and $R_5$ represent hydrogen, methyl or ethyl. As starting material there are used compounds of the formula $$\begin{array}{c} R_1 \quad H \\ H-C-C-R_3 \\ R_2 \quad OH \end{array}$$

in which $R_1$, $R_2$ and $R_3$ have the same significance as in Formula I and $R_3$ can, in addition, stand for the group —$COOR_6$, $R_6$ standing preferably for alkyl with 1–4 carbon atoms. According to the process of the present invention there can be obtained, for instance, acrylic acid, crotonic acid, ethyl acrylic acid, and β,β-dimethyl acrylic acid as well as their nitriles, furthermore the unsubstituted amides, the N-methyl-substituted amides, the N-dimethyl-, N-ethyl-, N-ethyl-methyl-, and N-diethyl-substituted amides of the compounds quoted above, furthermore carboxylic acids with a longer carbon chain, such as β-propyl acrylic acid, β-butyl acrylic acid, β,β-diethyl acrylic acid, β-methyl-β-propyl acrylic acid etc., and their derivatives.

As acidic agents there may be used phosphoric acid, pyrophosphoric acid, meta- and polyphosphoric acids containing not more than 6 phosphorus atoms, hydrogen chloride and mixtures of these acids. Phosphoric acid has proved to be particularly effective. The use of phosphoric acids is also of advantage in so far as they can easily be separated from the reaction products on account of their non-volatility.

For the reaction according to the present invention there are used 1–90 percent, preferably 20–40 percent of the inorganic acid, calculated upon the mixture. Instead of the said mixtures, there may also be used mixtures of the acids mentioned above, advantageously of phosphoric acid, with sulfuric acid, acetic acid and propionic acid. The above mentioned acids, for instance, the phosphoric acid, should be contained in the starting mixture in a concentration of at least 1 percent.

The separated phosphoric acid can immediately be reused if the correct concentration was observed. It contains about 10 percent of polyphosphoric acids, among them the pyrophosphoric acid. When repeatedly using this mixture of phosphoric acids, the above quoted composition does not vary any more, the reason being that the steam which is present at the same time constantly causes hydrolysis of the phosphoric acids. However, the yield of α-β-unsaturated compounds, such as acrylonitrile, is not influenced unfavorably if the phosphoric acid used for dehydration contains portions of polyphosphoric acids.

It is also possible, although less advantageous, to use polyphosphoric acids containing not more than 6 phosphorus atoms. In this case, however, partial hydrolysis constantly takes place at the high temperatures by means of the water. Polyphosphoric acids in admixture with water have the same effect as orthophosphoric acid.

The above mentioned acids can advantageously be used in a hydrous form. If, however, hydrogen chloride is used, the anhydrous acid may also be employed.

It is in the nature of the reaction that the functional terminal groups of the acid derivatives can likewise be altered by the acidic agents used. Acrylic acid is thus obtained from ethyl lactate when using phosphoric acid. Furthermore, when using hydrogen chloride, the acrylonitrile is hydrolyzed during the reaction to acrylic acid.

The process of the present invention is advantageously carried out under reduced pressure. It is of advantage if the period under reduced pressure ranges from 0.1 to 0.6 second but the operation can also be carried out with shorter periods or, in the presence of inert gases, also with longer periods. Such short periods are, for instance produced by passing the starting materials under reduced pressure through the reaction tube.

In addition, the vapours of the compounds to be reacted can be diluted with larger quantities of indifferent gases which are free from oxygen, such as nitrogen or oxygen-free steam.

When working under reduced pressure, the presence of indifferent gases, for instance of steam, has likewise proved to be of advantage.

The acidic agents can also be applied on carrier substances, which are advantageously installed in the reaction tube. It is not necessary to employ porous carrier substances but carriers with small surfaces are preferred. In the presence of phosphoric acid, carbon can only be employed at low temperatures since, otherwise, a reduction of the phosphoric acid takes place. There are especially suitable quartz, natural calcium phosphate or aluminium phosphate, furthermore kieselguhr, and artificial xerogels. If the acids are applied on carrier substances they need not be injected.

The yield can be raised considerably if the mixture consisting of α-hydroxy-carboxylic acids or their derivatives and of acidic, liquid agents is introduced, in a finely divided state, into a heated reaction tower at temperatures ranging from 520–700° C., preferably from 580–650° C., in which case it is of advantage to operate under reduced pressure and to add water to the mixture or to blow steam into the tower.

The compound to be converted, for instance lactic acid nitrile, is mixed under a pressure of about 30 to 100 mm. of mercury, with agents showing an acid reaction, for instance, with concentrated phosphoric acid, and the reaction mixture is used in a finely divided state. This fine distribution can, for instance, be achieved by atomisation through nozzles, that is to say, by spraying the reaction mixture as fine as possible through a nozzle into the chamber where the dehydration is to take place. The chamber which might be used with or without installations has a cylindrical shape and carries the injection nozzle at the top, so that the injected material can pass through the reaction chamber in a free fall and in a finely distributed state for instance, in the form of a spray. In the lower part of the reaction chamber which is conical, the material is cooled as rapidly as possible either by cooling from outside or by injection of water, consequently in the presence of steam. The heat which is necessary for the reaction can be supplied by external heating or by exposing the spray cone of the reaction mixture directly to the action of indifferent gases free from oxygen, for instance, burnt gases which are free from oxygen and have the required temperature.

Under certain conditions, especially, when the reaction heat is supplied from outside and the fine distribution is effected by using inert gases as carriers for the finely distributed reaction mixture, the reaction chamber can be provided with installations which enlarge the reaction surfaces. If the fine distribution of the reaction mixture is achieved by pressing it through nozzles, while heating simultaneously from outside, it is of advantage if the diameter of the reaction chamber is of such a size that the spray cone does not touch the walls. In many cases it has proved to be of advantage to mix the mixture to be reacted directly with superheated steam in an eddy-current nozzle.

The reaction mixture can be worked up in a simple manner. When operating under reduced pressure, the water and non-volatile acids, for instance phosphoric acid, are separated from the reaction products in a separator. The phosphoric acid can, for instance, be recovered by distillation and can then be re-utilised in admixture with, for instance, lactic acid nitrile. The gases leaving the separator can be washed once more for a short time in a spray tower with a dilute solution of the acid used as starting material in order to remove the last traces of this acid. When using a nitrile as starting material, the gases pass into a tower which is charged with a concentrated, weakly alkaline solution of the same nitrile (pH=7–8). Hydrocyanic acid and aldehyde combine to the next higher nitrile which is re-introduced into the furnace. The acrylonitrile, for instance, can then be prepared in known manner by washing with water before or after the vacuum pump.

If, however, the operation is carried out under normal pressure in the presence of burnt gases, the gases leaving the furnace and the liquid can be completely cooled and the gases and the aqueous condensate can then be worked up separately. When preparing acrylonitrile, the gaseous portion is, for instance, freed from hydrocyanic acid and acetaldehyde in a spray tower charged with a weakly alkaline solution of lactic acid nitrile (pH 7–8) as described above. The acrylonitrile contained in the gas is removed in the manner described above. The homologous nitriles, the respective carboxylic acids, and the derivatives obtained by the two methods can be worked up in the same manner.

The aqueous liquid is best evaporated under reduced pressure. At the top of the fractionating column used for this operation, hydrocyanic acid, acetaldehyde, and acrylonitrile are withdrawn and passed into the tower sprayed with lactic acid nitrile. In the centre of the column water is obtained which may serve for washing the acrylontrile out of the gas current. Concentrated phosphoric acid is obtained as non-volatile portion which may be re-utilized as starting material. This process can be rendered more economic from an energy point of view if the condensation heat of the products leaving the furnace is used for heating the described vacuum column.

An apparatus for carrying out the process—which, in this case, concerns the preparation of acrylonitrile—by means of pressing the material through a nozzle is diagrammatically illustrated in the accompanying drawings 1 and 2.

In Figure 1 the vessel 1 contains the mixture consisting of phosphoric acid and lactic acid nitrile. By means of pressure nitrogen 11, the mixture is forced through the tube 2 into the electric furnace 3 and through filter 4 into nozzle 5. The product passes the reaction tube 6 with the lower conical part 7, then the cooler 8, and reaches finally the separator 9. Through the connecting piece 10 nozzle 5 may be fed with steam.

Figure 2 shows the furnace which is directly heated with burnt gases. The burnt gases which are free from oxygen are produced in the combustion chamber 12. They are prepared from the heating gas entering at 13 and from air which is necessary for the combustion and enters at 14. The steam required for adjustment of the reaction temperature is admitted at 15. The gases are conducted through the distributor ring 16 into the reaction chamber 17. By means of pressure nitrogen 11, the mixture of phosphoric acid and lactic acid nitrile is pressed from the vessel 1 through the pipe 2 into the furnace 18. It is filtered in 4 and finely distributed by means of nozzle 19. Steam may also be supplied through the connecting piece 20. The reaction product is cooled in the cooler 8 and collected in separator 9.

Although it has already been described to prepare crotonic acid nitrile from propionic aldehyde cyanhydrin (α-hydroxy-butyric acid nitrile) by heating with phosphorus pentoxide, it is expressly pointed out that the lactic acid nitrile CN—CH(OH)—CH₃ does not yield the expected acrylic acid nitrile.

In this reaction, phosphorus pentoxide is only used as dehydrating agent which must always be renewed. In the process of the present invention the free acids are used. These acids have not only a catalytic effect but they can also be used with advantage in the presence of water or in the form of the hydrous acids whilst in the reaction formerly described water must not be present.

The following examples serve to illustrate the invention, but they are not intended to limit it thereto, the parts being by weight.

Example 1

(A) Through a quartz tube of 30 mm. internal diameter and 1000 mm. length filled with pieces of quartz, there are passed, at 600° C. and under a pressure of 20 mm. of mercury and for a duration of stay of 0.28 second, 100 grams per hour of a mixture consisting of 100 parts of lactic acid nitrile, 70 parts of water, and 40 parts of phosphoric acid of 85 percent strength. The phosphoric acid is separated at 100° C. from the product leaving the reaction tube. Subsequently, the volatile constituents are completely liquefied and worked up by distillation. 30 percent of the lactic acid nitrile used as starting material are obtained as a mixture of acetaldehyde and hydrocyanic acid, 51 percent as acrylonitrile and 16 percent as lactic acid nitrile. The loss of substance amounts to 3 percent.

(B) Through the apparatus described under A there are conducted, at the same temperature and at a pressure of 760 mm. of mercury, 100 grams per hour of a mixture consisting of 100 parts of lactic acid nitrile, 1000 parts of water, and 30 parts of phosphoric acid of 85 percent strength, the duration of stay amounting to 6.9 seconds. The product is worked up as described under A and yields 10 percent of acrylonitrile in addition to unchanged lactic acid nitrile.

Example 2

Through the apparatus described in Example 1, there are passed, at a temperature of 600° C. and under a pressure of 20 mm. of mercury, 100 grams per hour of a mixture consisting of 100 parts of α-hydroxy-butyric acid nitrile (obtained by addition of hydrocyanic acid to propionic aldehyde), 50 parts of water and 50 parts of phosphoric acid of 85 percent strength. The duration of stay of the reaction mixture in the reaction tube amounts to 0.34 second. The volatile constituents are completely condensed after leaving the furnace and are separated from each other by distillation. There are obtained 45 percent of crotonic acid nitrile and 20 percent of a mixture of propionic aldehyde and hydrocyanic acid, and 18 percent of the unchanged starting material. The mixture of propionic aldehyde and hydrocyanic acid is then worked up to α-hydroxy-butyric acid nitrile and re-introduced into the process. The entire yield amounts to about 83 percent.

Example 3

Through the apparatus described in Example 1 there are passed, at a temperature of 590° C. and under a pressure of 20 mm. of mercury, 100 grams per hour of a mixture consisting of 100 parts of α-hydroxy-valeric acid nitrile, 70 parts of glacial acetic acid, and 50 parts of phosphoric acid of 85 percent strength. The duration of stay amounts to 0.58 second. The phosphoric acid is separated in the separator. The volatile constituents are condensed in the other receivers cooled to −80° C., and worked up by distillation. 40 percent of the α-hydroxy-valeric acid nitrile used as starting material are obtained in the form of β-ethyl-acrylic acid nitrile in addition to 30 percent of unchanged starting material. The whole yield amounts to about 70 percent.

Example 4

After removing the quartz filling, there are passed through the quartz tube described in Example 1, at a temperature of 600° C. and under a pressure of 20 mm. of mercury, 100 grams per hour of a mixture consisting of 100 parts of lactic acid nitrile, 30 parts of water, and 25 parts of hydrochloric acid of 36 percent strength. The duration of stay amounts to 0.26 second. After 5 hours the reaction products are worked up according to the method specified in Example 1. 5 percent of the lactic acid nitrile used as starting material is obtained in the form of acrylonitrile and 65 percent in the form of an aqueous solution of acrylic acid.

If, instead of 25 parts of hydrochloric acid of 36 percent strength, 30 parts of aqueous hydrobromic acid of 30 percent strength are used, acrylonitrile and, especially, acrylic acid are formed.

Example 5

Through the quartz tube mentioned in Example 1 there are passed, at a temperature of 620° C. and under a pressure of 20 mm. of mercury, 90 grams per hour of a mixture of 100 parts of lactic acid ethyl ester, 40 parts of water, and 30 parts of phosphoric acid of 85 percent strength. The duration of stay amounts to 0.41 second. The separation of the phosphoric acid and the condensation of the reaction gases are carried out as described in Example 1. The working up of the condensate by distillation shows that 55 percent of the ester used as starting material are converted into acrylic acid. In addition, acetaldehyde, ethyl alcohol and ethylene can be separated.

Example 6

Through the quartz tube mentioned in Example 1, there are passed, at a temperature of 600° C. and under a pressure of 20 mm. of mercury, 100 grams per hour of a mixture consisting of 100 parts of lactic acid, 30 parts of water, and 20 parts of phosphoric acid of 85 percent strength. The duration of stay amounts to 0.47 second. From the aqueous condensate obtained upon cooling of the reaction gases the acrylic acid formed was separated by extraction with ether in a yield of 40 percent.

Example 7

In an empty tube 6 (see Figure 1) of refined steel which has a length of about 2000 mm. and an internal diameter of 230 mm. and is heated electrically to a wall temperature of 650° C., there are atomised 3 kilograms per hour of a mixture consisting of 2 parts of lactic acid nitrile and 1 part of phosphoric acid of 85 percent strength under a pressure of about 100 mm. of mercury by means of an eddy-current nozzle (5) run per hour with 1 kilogram of steam at 250° C. The duration of stay of the starting materials in the reaction tube amounts to 4.6 seconds. From the gases leaving the reaction tube the phosphoric acid is separated at 100° C. Subsequently, the gases still under reduced pressure are cooled to 20° C. in an ascending cooler with a separator arranged below it. The residual gases consisting of acrylonitrile, hydrocyanic acid, and acetaldehyde freed in the above manner from phosphoric acid and steam pass then a washing tower charged with phosphoric acid of 20 percent strength for elimination of any phosphoric acid vapours that might be carried along. Finally they reach a tower which is filled with Raschig rings and is sprayed with a weakly alkaline solution of 80 percent strength of lactic acid nitrile having a pH value of 7.0–7.5. The passing gaseous acrylonitrile is here freed from hydrocyanic acid and acetaldehyde by formation of lactic acid nitrile. The acrylonitrile leaving this tower passes now into the vacuum pump and is condensed on the pressure side of the pump. Allowing for the quantity of the product which remains in the washing towers on account of its solubility, there are obtained, per hour, 1.10 kilogram of an acrylonitrile of 95 percent strength which contains small amounts of water, hydrocyanic acid, acetaldehyde, and lactic acid nitrile, which corresponds to a yield of 70 percent. 0.46 kilogram (=23 percent) of the lactic acid nitrile decomposes in the reaction furnace to yield hydrocyanic acid and acetaldehyde which are again transformed into lactic acid nitrile. The effective yield of acrylonitrile amounts to about 90 percent. The phosphoric acid accumulating in the separator which is worked at 100° C. is mixed with new lactic acid nitrile for re-use in the furnace.

Example 8

The apparatus illustrated in Figure 2 is used for this example. Per hour 15 Nm³ of illuminating gas are completely burnt with 56 Nm³ of air in the combustion chamber 12 which has an internal width of 340 mm. and is lined with firebricks. The superheated burnt gases which are free from oxygen are cooled to 1150° C. by mixing with steam of about 180° C. With this temperature the mixture of burnt gases and steam passes through a distributor ring 16 into a reaction furnace 18 which is lined with firebricks and has an internal width of 500 mm. and a length of 2000 mm. 43.2 kilograms per hour of a mixture consisting of 2 parts of lactic acid nitrile and 1 part by weight of phosphoric acid of 85 percent strength are supplied just above the distributor ring 16 by way of 2, 4, and 19 in the manner as described in Example 7. The duration of stay amounts to 3.1 seconds. The temperature prevailing at the furnace entrance amounts to 600–620° C. Upon leaving the furnace, the reaction gases are cooled by directly injecting water. The condensate is then freed from all reaction products by distillation. In this manner there are obtained per hour 15 kilograms of acrylonitrile corresponding to 70 percent of the lactic acid nitrile used as starting material in admixture with 6.6 kilograms of hydrocyanic acid and acetaldehyde and 2.4 kilograms of water. By working up this mixture of hydrocyanic acid and acetaldehyde to yield lactic acid nitrile and by leading the nitrile back into the process, a total yield of about 89 percent is obtained.

This example shows that the duration of stay of 0.1 to 0.6 second quoted above need not be strictly observed and may be exceeded when operating with indifferent gases having a diluting effect.

From the above examples can be seen that the total yield can be considerably raised by the fine distribution of the reaction mixture.

We claim:

1. A process for preparing a compound of the formula:

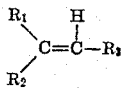

wherein $R_1$ and $R_2$ are selected from the group consisting of hydrogen and alkyl, $R_1$ and $R_2$ together containing not more than two carbon atoms, $R_3$ is selected from the group consisting of —COOH,

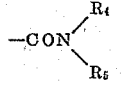

and —CN, and $R_4$ and $R_5$ are selected from the group consisting of hydrogen, methyl and ethyl which comprises heating a compound of the formula:

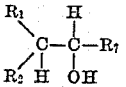

wherein $R_7$ is selected from the group consisting of —COOH,

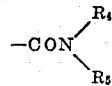

—CN and —COOR$_6$, $R_6$ being a lower alkyl radical of from one to four carbon atoms and $R_1$, $R_2$, $R_4$ and $R_5$ having the values defined above, with an acid selected from the group consisting of phosphoric acid, pyrophosphoric acid, meta- and polyphosphoric acids containing not more than 6 phosphorous atoms and hydrochloric acid at a temperature of from about 520°–700° C., the amount of acid by weight being from 1–90% of the total weight of the reactants.

2. The process of claim 1 wherein the reaction is carried out by heating under reduced pressure for a short time.

3. The process of claim 2 including the step of diluting the reacting gases with inert gases free from oxygen.

4. The process of claim 1 wherein the acid is in aqueous solution.

5. The process of claim 1 wherein the temperature is from about 580° C. to 700° C. and the acid compound is in aqueous solution and present in an amount of 20 to 40% by weight of the reactants.

6. The process of claim 1 wherein the compound of the formula:

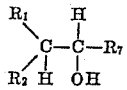

and the selected acid is blown as a finely divided reaction mixture into a reaction zone.

7. The process of claim 6 wherein a hot, inert gas free from oxygen heats the finely divided reaction mixture in the reaction zone.

8. The process of claim 1 wherein the selected acid is in the gaseous state.

9. The process for preparing acrylonitrile which comprises the step of heating lactic acid nitrile with an acid selected from the group consisting of phosphoric acid, pyrophosphoric acid, meta- and polyphosphoric acids containing not more than six phosphorous atoms and hydrochloric acid at a temperature of from about 520°–700° C., the amount of acid by weight being from 1–90% of the total weight of the reactants.

References Cited in the file of this patent

UNITED STATES PATENTS

| | | |
|---|---|---|
| 2,208,328 | Lichty | July 16, 1940 |
| 2,226,645 | Thomas et al. | Dec. 31, 1940 |
| 2,356,247 | Kirk et al. | Aug. 22, 1944 |
| 2,452,672 | Miller et al. | Nov. 2, 1948 |
| 2,469,701 | Redmon | May 10, 1949 |